United States Patent
Bestmann et al.

(10) Patent No.: US 9,009,857 B2
(45) Date of Patent: Apr. 14, 2015

(54) TEMPORALLY CONTROLLING ACCESS TO SOFTWARE ASSETS ON USER DEVICES

(71) Applicant: Absolute Software Corporation, Vancouver (CA)

(72) Inventors: Martin Bestmann, Neunkirchen (DE); Jeremy Cartier, Denman Island (CA); Jens Miltner, Neunkirchen (DE)

(73) Assignee: Absolute Software Corporation, Vancouver, BC (CA)

( * ) Notice: Subject to any disclaimer, the term of this patent is extended or adjusted under 35 U.S.C. 154(b) by 246 days.

(21) Appl. No.: 13/662,327

(22) Filed: Oct. 26, 2012

(65) Prior Publication Data

US 2013/0111610 A1  May 2, 2013

Related U.S. Application Data

(60) Provisional application No. 61/553,107, filed on Oct. 28, 2011.

(51) Int. Cl.
| | |
|---|---|
| *H04L 29/06* | (2006.01) |
| *G06F 21/62* | (2013.01) |
| *G06F 7/04* | (2006.01) |
| *G06F 17/30* | (2006.01) |
| *H04N 7/16* | (2011.01) |
| *G06F 11/00* | (2006.01) |
| *G06F 12/14* | (2006.01) |
| *G06F 12/16* | (2006.01) |

(52) U.S. Cl.
CPC .................................. *G06F 21/6245* (2013.01)

(58) Field of Classification Search
None
See application file for complete search history.

(56) References Cited

U.S. PATENT DOCUMENTS

| | | |
|---|---|---|
| 5,437,042 A | 7/1995 | Culley et al. |
| 5,450,593 A | 9/1995 | Howell et al. |
| 5,715,174 A | 2/1998 | Cotichini et al. |
| 5,764,892 A | 6/1998 | Cain et al. |
| 5,802,280 A | 9/1998 | Cotichini et al. |
| 5,859,968 A | 1/1999 | Brown et al. |
| 6,244,758 B1 | 6/2001 | Solymar et al. |
| 6,269,392 B1 | 7/2001 | Cotichini et al. |
| 6,300,863 B1 | 10/2001 | Cotichini et al. |
| 6,507,914 B1 | 1/2003 | Cain et al. |
| 6,678,824 B1 | 1/2004 | Cannon et al. |
| 6,748,542 B2 | 6/2004 | Box |
| 6,889,212 B1* | 5/2005 | Wang et al. ..................... 705/59 |
| 7,043,581 B1 | 5/2006 | Gulick |
| 7,484,245 B1 | 1/2009 | Friedman et al. |

(Continued)

OTHER PUBLICATIONS

International Search Report in International Appl. PCT/CA2012/001002 in 5 pages.

(Continued)

*Primary Examiner* — Shin-Hon Chen
(74) *Attorney, Agent, or Firm* — Knobbe, Martens, Olson & Bear, LLP (57) ABSTRACT

The availability of software assets on electronic devices, such as mobile devices of users, is restricted based on the time as determined by a managing server. An application that runs on the electronic devices communicates with the server to obtain information regarding which software assets are permitted to be accessed, and restricts user access accordingly. The server may use a clock, in combination with administrator-generated access restriction policies, to determine which software assets are to be made available on each electronic device at particular points in time.

24 Claims, 4 Drawing Sheets

(56) References Cited

U.S. PATENT DOCUMENTS

| | | |
|---|---|---|
| 7,921,089 B2 | 4/2011 | Kailash et al. |
| 7,930,755 B1 * | 4/2011 | Miller .............................. 726/26 |
| 8,161,411 B2 * | 4/2012 | Robbin et al. ................ 715/854 |
| 8,266,581 B2 | 9/2012 | Brandt et al. |
| 8,590,028 B2 * | 11/2013 | Saxena et al. ..................... 726/9 |
| 8,677,430 B2 * | 3/2014 | Mitsuji et al. .................. 725/93 |
| 2001/0007133 A1 | 7/2001 | Moriconi et al. |
| 2003/0219106 A1 | 11/2003 | Ferrier |
| 2004/0158829 A1 * | 8/2004 | Beresin et al. ................ 717/178 |
| 2005/0044191 A1 * | 2/2005 | Kamada et al. ............... 709/223 |
| 2005/0071657 A1 | 3/2005 | Ryan |
| 2005/0089062 A1 | 4/2005 | Zegelin |
| 2005/0216757 A1 | 9/2005 | Gardner |
| 2006/0129495 A1 * | 6/2006 | Okamoto et al. ............... 705/59 |
| 2006/0272020 A1 | 11/2006 | Gardner |
| 2006/0287956 A1 | 12/2006 | Higashi et al. |
| 2007/0074284 A1 | 3/2007 | Woog |
| 2007/0101316 A1 | 5/2007 | Berndt |
| 2008/0222707 A1 | 9/2008 | Pathuri et al. |
| 2008/0276311 A1 | 11/2008 | Kassovic |
| 2008/0307507 A1 | 12/2008 | Conley et al. |
| 2009/0119217 A1 * | 5/2009 | Ham ................................ 705/59 |
| 2009/0165083 A1 * | 6/2009 | McLean et al. .................... 726/1 |
| 2009/0182670 A1 * | 7/2009 | Farrugia et al. ................. 705/51 |
| 2009/0254482 A1 | 10/2009 | Vadlamani et al. |
| 2010/0023523 A1 * | 1/2010 | Chung et al. ...................... 707/9 |
| 2010/0325735 A1 | 12/2010 | Etchegoyen |
| 2011/0088026 A1 * | 4/2011 | Swann .......................... 717/173 |
| 2011/0227857 A1 * | 9/2011 | Chaudhri ...................... 345/173 |
| 2012/0110338 A1 * | 5/2012 | Druschel et al. ............. 713/182 |
| 2012/0124389 A1 * | 5/2012 | Villani et al. ................. 713/189 |
| 2012/0209999 A1 | 8/2012 | Chen-Quee et al. |
| 2012/0240183 A1 * | 9/2012 | Sinha ................................ 726/1 |
| 2013/0030954 A1 * | 1/2013 | Liu et al. ...................... 705/26.7 |

OTHER PUBLICATIONS

Written Opinion issued Feb. 5, 2013 in PCT/CA2012/001002 of Absolute Software Corporation.

International Search Report issued Feb. 5, 2013 in PCT/CA2012001002 of Absolute Software Corporation.

* cited by examiner

TEMPORALLY CONTROLLING ACCESS TO SOFTWARE ASSETS ON USER DEVICES

PRIORITY CLAIM

This application claims the benefit of U.S. Provisional Appl. No. 61/553,107, filed Oct. 28, 2011.

TECHNICAL FIELD

The present disclosure relates to the protection of proprietary or sensitive data stored on computing and other electronic devices by limiting access to it based on time. More specifically, it relates to a security system, server, device and method for temporally controlling access to software assets on remote electronic devices.

BACKGROUND

Proprietary information is routinely accessed or stored on electronic devices such as tablet computers, smart phones, personal computers, laptop computers and personal digital assistants, and the need to protect such proprietary or sensitive data from theft, misuse or inadvertent distribution is self-evident.

It is difficult to manage documents and other files sent to mobile electronic devices as there is often no control once a document has been sent to such a device. This is true, in particular, when documents are sent to such devices via email or via a drop-box.

SUMMARY

The subject matter described herein provides a system, server, device and method for the protection of software assets stored on an electronic device by permitting access to them for a limited period of time or between certain times of the day. Outside of the permitted times, users will not have access to the software assets, which may be documents, spreadsheets, files, images, folders, digital assets, applications, apps, configuration profiles, etc. The time is preferably determined by a clock in or accessible to a server, so that the security of the documents is not compromised if the device clocks are tampered with.

Software assets are automatically deleted once their expiry time has passed. If access to the software assets is allowed intermittently, then the system makes the assets unavailable between the periods of allowed access.

If the device is lost or stolen, a command can be sent to it by the server to delete, or otherwise make inaccessible, some or all of the software assets on the device.

Disclosed herein is a system for limiting availability of software assets on electronic devices comprising: a memory storing software assets and availability times for the assets to be accessed on an electronic device; a clock; a processor connected to the memory and clock and configured to process computer readable instructions stored in the memory in order to transmit the availability times and copies of the assets to the device; and the electronic device, remote from the processor; wherein the electronic device comprises a safe that is configured to: receive a copy of an asset; permit access to the copy of the asset when a current time as determined by the clock is within the availability time; and deny access to the copy of the asset when the current time as determined by the clock is outside the availability time.

Also disclosed herein is a method for limiting availability of software assets on electronic devices comprising the steps of: storing, in a server, software assets and availability times for the assets to be accessed on a remote electronic device; processing, by the server, computer readable instructions stored in a memory in order to transmit the availability times to the device; transmitting a copy of the asset from the server to the device; permitting, by the device, access to the copy of the asset when a current time, as determined by a clock in the server, is within the availability time; and denying, by the device, access to the copy of the asset when the current time, as determined by the clock in the server, is outside the availability time.

Further disclosed herein is a server for limiting availability of software assets on electronic devices comprising: a memory storing software assets and availability times for the assets to be accessed on an electronic device; a clock; and a processor connected to the memory and clock and configured to process computer readable instructions stored in the memory in order to transmit the availability times and copies of the assets to the device; wherein a copy of an asset is transmitted to the device during the availability time.

Still further disclosed herein is an electronic device for limiting availability of software assets comprising: a safe embodied in computer readable instructions in a memory, which, when executed by a processor cause the device to: receive a copy of an asset from a remote server; permit access to the copy of the asset when a current time, as determined by a clock in the server, is within the availability time; and deny access to the copy of the asset when the current time, as determined by the clock in the server, is outside the availability time.

This summary is not an extensive overview intended to delineate the scope of the subject matter that is described and claimed herein. The summary presents aspects of the subject matter in a simplified form to provide a basic understanding thereof, as a prelude to the detailed description that is presented below.

BRIEF DESCRIPTION OF THE DRAWINGS

For a fuller understanding of the nature and advantages of the disclosed subject matter, as well as the preferred mode of use thereof, reference should be made to the following detailed description, read in conjunction with the accompanying drawings. In the following drawings, like reference numerals designate like or similar parts or steps.

DETAILED DESCRIPTION OF SPECIFIC EMBODIMENTS

The following detailed description is presented largely in terms of methods or processes, symbolic representations of operations, functionalities and features of specific embodiments of the invention. These method descriptions and representations are the means used by those skilled in the art to most effectively convey the substance of their work to others skilled in the art. A software implemented method or process is here, and generally, conceived to be a self-consistent sequence of steps leading to a desired result. These steps involve physical manipulations of physical quantities. Often, but not necessarily, these quantities take the form of electrical or magnetic signals capable of being stored, transferred, combined, compared, and otherwise manipulated. It will be further appreciated that the line between hardware, software and firmware is not always sharp, it being understood by those skilled in the art that software implemented processes may be embodied in hardware, firmware, and/or software, in the form of coded instructions such as in microcode and/or in stored programming instructions.

In general, unless otherwise indicated, singular elements may be in the plural and vice versa with no loss of generality. The use of the masculine can refer to masculine, feminine or both. Drawings are not to scale.

In the context of this disclosure, a 'software asset' or 'asset' is in general used to represent any kind of electronic file that is protected using the time-based security system disclosed herein. Such software assets may be, for example, text documents, spreadsheets, image files, video files, audio files, databases, applications, apps, mobile media, files in general, documents in general or any other kind of electronically storable information. Other types of asset, such as configuration profiles, provisioning profiles and applications may be stored in a different container app or securely in an operating system. The asset may be copied from a central or distributed server to remote electronic devices, and such copies of the assets may still be referred to as assets.

A 'safe' is a container or application running on a remote electronic device that controls access to a software asset. The asset may be viewable or otherwise accessible on the device, but only through the safe. Access to the asset without the safe operable is denied, unless permission is granted for the asset to leave the safe. In some contexts, the term 'safe,' as used herein, may refer more specifically to either (1) a secure container or repository of assets created on an electronic device, or (2) the application that creates and manages this secure container or repository.

An 'availability time' is a duration for which an asset can be accessed on a remote electronic device. It may also be a series of intermittent durations. It may have a start time, an end time, or both. It may have a repetitive, partially repetitive or non-repetitive pattern of permitted durations. For example, an availability time may be every Monday, Wednesday and Friday between 9 am-noon and 3 pm-6 pm. The pattern of durations may be unending, or may be set to terminate at some future date. An availability time may be a continuous period, with no definite end. Outside of the availability time, the asset cannot be accessed on the remote electronic device, either because it has been deleted from the device, partially deleted, or because it has been encrypted.

A 'policy' may be used to define and embody availability times for one or a group of remote electronic devices. An asset associated with a policy may adopt a time availability for the policy as a whole. A device added to a policy may have assets already in the policy automatically made available to it.

Figure 1:
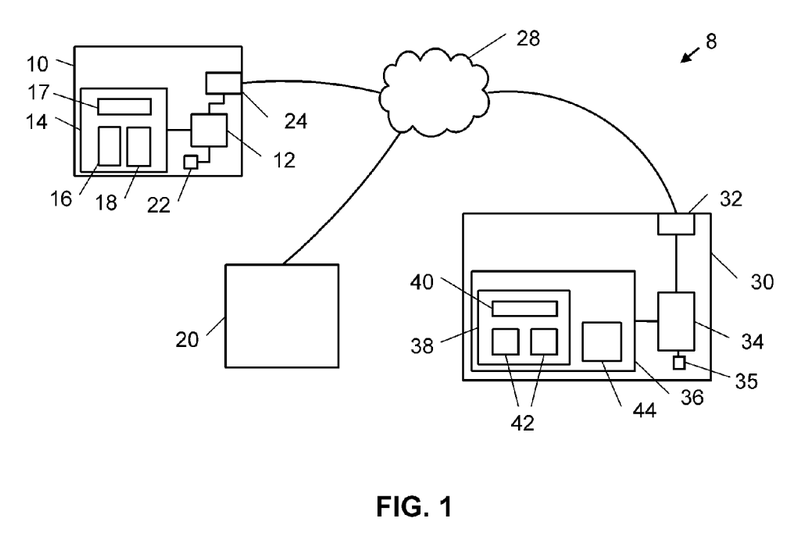
FIG. 1 is a schematic functional block diagram of a system for temporally controlling remote access to documents and files.

Referring to FIG. 1, the time-based security system 8 includes a server 10 with a processor 12 connected to memory 14, in which is stored computer readable instructions 16, one or more policies 17 and software assets 18. The server 10 may, in some embodiments, include multiple distinct computers or computing devices, which may be geographically distributed. The computer readable instructions 16, when processed by the processor 12, facilitate communication with remote electronic devices 30, which in general are mobile devices. An administrator may use the server 10, or optionally a remote computer 20 connected to the server 10, for managing the parameters of the computer readable instructions 16, the policies 17 relating to the remote electronic devices 30 and the software assets 18 to be made available to the remote electronic devices. A clock 22 is present in the server 10 which serves as a reference for determining the time with regards to the policies 17. The server 10 includes an interface 24 via which the processor 12 is connected to the network 28, which may be the Internet, a telecommunications network, or a combination of both.

One or more remote electronic devices 30 are connected to the network 28 via an interface 32. Each remote device 30 includes a processor 34 connected to the interface 32 and a memory 36. The memory stores an application acting as a safe 38 which contains one or more policies 40 relating to assets 42 that are protected by the system 8. The policies 40 may either be attached to the assets 42 or stored separately in the memory 36. A policy may be, or may include, a list of assets 42 and their related availability times. The safe 38 stores the assets 42, and the computer readable instructions of the safe 38 and applicable policies 40 control whether the asset can leave the safe or not. The memory 36 may also store other applications 44 which may be required for viewing or otherwise accessing the assets 42. Examples of remote devices 30 include an Android™ device, a Windows™ phone, an iPad™ tablet, an iPod Touch™ media device and an iPhone™ smart phone. As well as being able to manage the availability of assets 42 on remote mobile devices 30, the system 8 may also be used to manage the availability of assets on more traditional computing devices, such as desktop computers or laptops.

Figure 2:
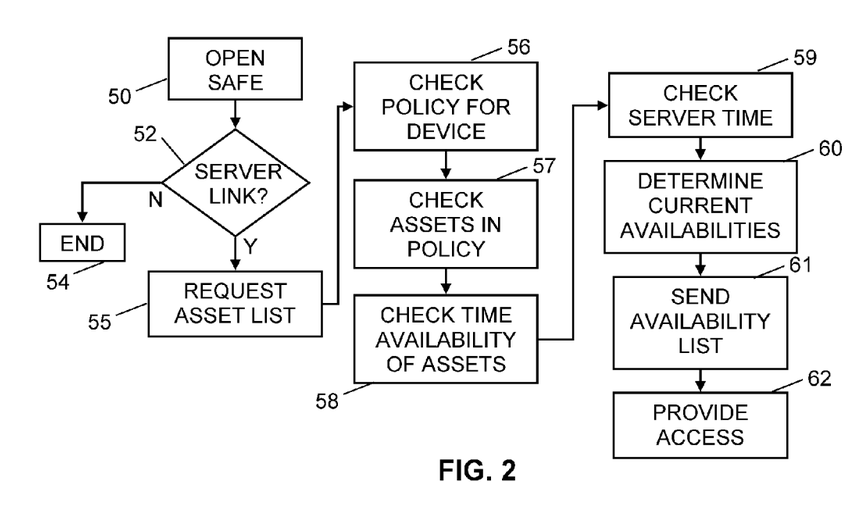
FIG. 2 is a flowchart of a process performed by a server and an electronic device on which it is desired to access a document.

Referring to FIG. 2, a flowchart shows the process a remote electronic device 30 and server 10 perform in relation to providing access to an asset 42. Prior to opening the safe 38 for the first time, there are no assets stored on the device 30. In step 50 the safe 38 opens upon the device 30 receiving a 'tap' from a user on an icon for the safe. After the safe 38 is started, it determines, in step 52, whether or not there is a connection to the server 10. In one embodiment, if there is no connection, nothing further will be done by the safe 38 to provide access to any assets 42 and the process will end in step 54. However, if there is a connection, the safe 38 will request a policy 40 or list of the available assets from the server 10, in step 55. The server 10 will then check, in step 56, which policy 17 or policies are applicable to the device 30. After determining the applicable policy 17, the server checks, in step 57, which assets 18 are listed in the policy. The server 10 then checks 58 the time availability of each of the assets 18 in the policy 17. After checking the current server time, in step 59, the server 10 determines, in step 60, which of the assets 18 are currently available to the device 30 by comparing the current time with the time availability for each asset. Checking the time at the server is preferable to using the device time as it is less prone to tampering. The server 10 then sends a list (or policy 40) of the available assets 18 to the device 30 in step 61. The device 30 then displays the list and provides access 62 to the assets 18 when icons or links representing them are tapped on by a user. When a user taps on the name of an asset 42, it is downloaded from the server 10 if it is not already present on the device. Assets in the list which are displayed as grayed out are available to the user but have not been downloaded to the device. There may be assets 42 that are already present on the electronic device and these are shown in full color, or black text, i.e. not grayed out. As an option, assets 42 for which an upgraded version is available on the server 10 are indicated with a "+" marker or other identifying marker. Assets 42 stored on the device 30 may be made unavailable by encryption, partial encryption, encryption key deletion, data rearrangement or partial deletion. In providing access to an asset 42, the device 30 displays the asset on its screen. Depending on the values of the parameters of the asset 42, it may also be made available for emailing, printing or screen capture.

While connected to the server 10, availability times of assets 42 currently being accessed or listed on the device 30 may change. As well, an administrator may make changes to the availability of the assets during a user's access to them. In order to transfer the changes of availability status to the device 30, the server 10 pushes notifications of the changes as and when necessary to the device. For example, if a new asset 18 is added to the existing assets in a repository in memory 14, and the new asset is currently set as available, the name of the new asset will be pushed to the device 30. This way the availability list in policy 40 in the safe 38 can be kept up to date in real time. In one embodiment, for example, the server may check every 10 minutes and send a message to the device to call in to check the updated asset availability.

If assets 42 are removed from a policy 40 to which a device 30 is assigned, or if a device is removed from a policy permitting access to certain assets on the device, then the system 8 will automatically have the effect of denying access to such assets on the device 30. This will occur as a result of a push notification from the server 10 to the device 30, or the device requesting the available asset list in step 55.

Some assets may be downloaded to a safe with an unending availability time, so that the user has access to these assets at all times. The effective start of the availability time may be the time the asset is first copied to the device. Some assets that have intermittent availability may also have an overall unending availability time, such that the pattern continues indefinitely into the future. These assets will be protected by the security features of the safe, such that they may be deleted or made inaccessible if the device is reported to be lost or stolen. Furthermore, if the device or these assets are taken out of the respective policy, the assets will automatically be removed from the device's safe.

In some embodiments, the assets are stored by the safe 38 (application) on an electronic device 30 in an encrypted form. When a user attempts to access such an asset (e.g., via a user interface of the safe application) during a valid period of availability, the safe uses an encryption key to temporarily decrypt the asset on the device, and makes the decrypted asset available. The safe may obtain the decryption key from the server 10, and may, in some cases, use different encryption keys for different assets. Because the assets are not persistently stored on the device in decrypted form in such embodiments, they can only be accessed by the user via the safe, and not directly through the operating system or other applications. The assets may, in some embodiments, be encrypted using device-specific keys, so that an asset encrypted for one user's device cannot be transferred to and used on another user's device without authorization.

Figure 3:
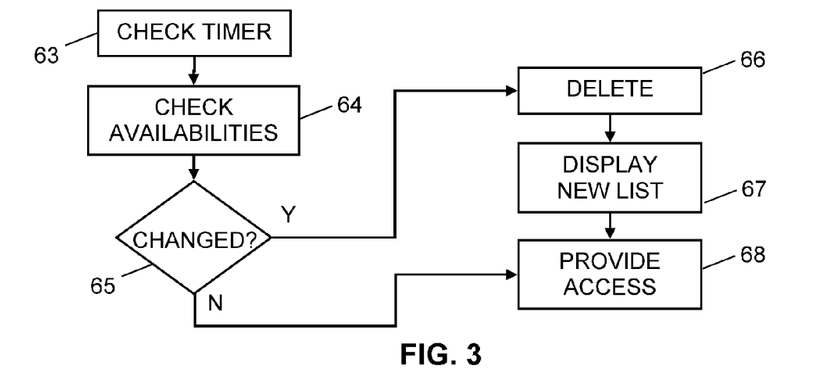
FIG. 3 is a flowchart of an alternate process performed by an electronic device on which it is desired to access a document.

Referring to FIG. 3, a flowchart of an another process is shown, which may be undertaken by a remote electronic device 30 when there is a link to the server or even when there is no link to the server 10. This process may be implemented by the safe 38 installed on the device. The process may occur before or after assets 42 have been downloaded to the device 30, or when downloaded assets 42 are available or unavailable. If the device 30 determines, in a step such as step 52 (FIG. 2), that there is no link to the server 10, it may resort to checking a timer 35 in the electronic device 30, in step 63. The timer 35 may simply be the clock in the device 30 or it may be a more sophisticated timer that counts forward changes in time but not backward changes, so that a user cannot reset the device clock back in time to access assets 42. Such a timer 35 may be a part of the safe 38. After the timer 35 has been checked, the safe 38 checks the time availabilities of the downloaded assets 42, in step 64, by checking policy 40. Details of the time availabilities are downloaded with the asset lists (or assets) when they are initially downloaded. If in step 65 the progress of time has not caused any of the currently available assets to extend beyond their time availability range, this particular process may stop, by providing continued access to those assets as normal, in step 68. If, however, in step 65, the progress of time has caused an asset to become unavailable, for example, it is deleted by the safe 38 in step 66, or otherwise made unavailable. Following this, an amended list of available assets is displayed on the device in step 67, and continued access to the available assets is provided in step 68. The processes of FIGS. 2 and 3 may occur concurrently.

Figure 4:
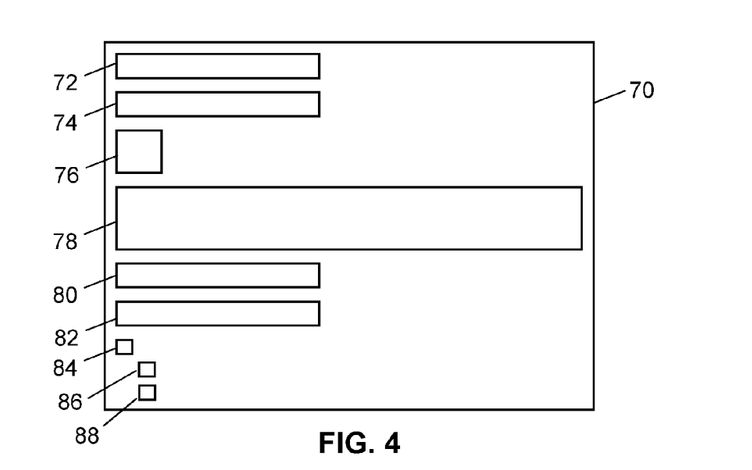
FIG. 4 is a schematic diagram of a software asset definition window, as seen by an administrator.

In FIG. 4, a schematic diagram of an asset definition window 70 is shown, as seen by an administrator, with various fields 72-88 for entering parameters of the asset 18. The window 70 may be displayed on computer 20, for example. The fields 72-88 may be labeled with names of the parameters. The asset 18 may be a media file, such as a document or image, for example. The fields are for the name 72 of the asset, category 74 of the asset (e.g. image or document), icon 76 for the asset, description 78, passphrase 80, verification of passphrase 82, checkbox 84 to denote whether the asset can leave the safe, checkbox 86 to denote that the asset can leave the safe via email and checkbox 88 to denote that the asset can leave the safe by being printed.

One or more of the parameters described above may be optional. Depending on the embodiment, further parameters for defining the asset 18 and its security may be included. For example, there may be a limit on the number of times that the asset 18 may be accessed by a remote device 30, or taking screen captures may be prevented when the asset 42 is displayed. A limit may be placed on the number of times the asset 42 can leave the safe 38.

Figure 5:
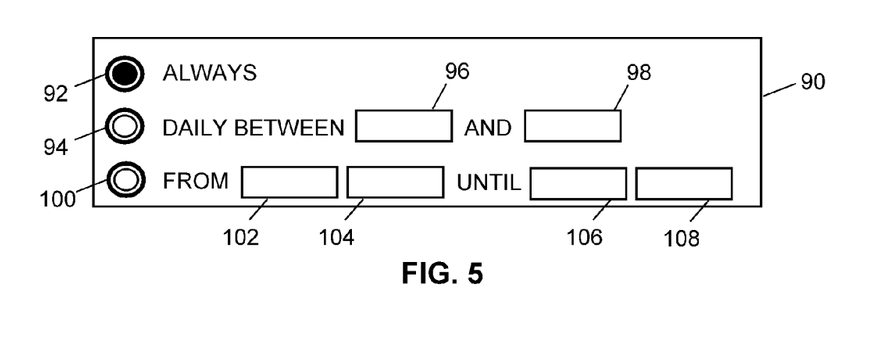
FIG. 5 is a schematic diagram of a window for setting the temporal availability of a document, as seen by an administrator.

Referring to FIG. 5, a schematic diagram of a time availability window 90 is shown, as displayed on computer 20, with entry fields that can be used for customization of the availability. After an asset 18 has been created in or moved to a repository that is managed by the time-based security system 8, it can be added to a policy 17 which can be applied to one or more remote electronic devices 30. Upon adding the asset 18 to the policy 17, the time availability of the asset can be defined. Window 90 shows a set of radio buttons 92, 94, 100 from which one can be selected depending on the time availability setting required for the asset 18. If button 92 is selected, the asset 18 will be available at all times on the device 30 or devices to which the particular policy 17 applies. If button 94 is selected, the asset 18 will be available daily between start time 96 and end time 98, the start and end times being entered by the administrator, or by being automatically populated according to device type, device owner or device location, for example. If button 100 is selected, the asset 18 will be available between a start date 102 and time 104 until an end date 106 and time 108, all determined by the administrator or by automatic population.

Depending on the embodiment of the system 8, other formats for time availabilities may be possible. This may involve making the assets available during working days only, or for a preset number of times, for example. Whenever an asset 18 is added to a policy 17, the time availability may be automatically set to a default value, such as always available, never available, or available for a predetermined, limited time.

Figure 6:
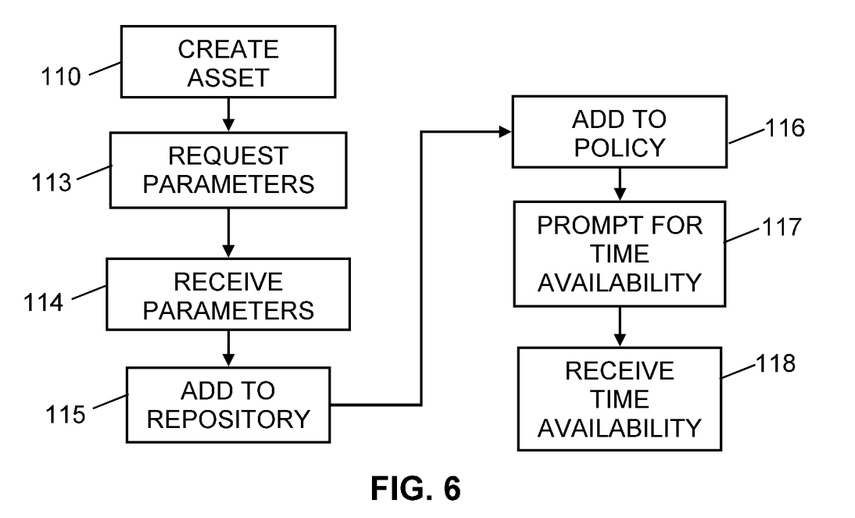
FIG. 6 is a flowchart of a process the system performs when setting the temporal availability of a document.

In FIG. 6 a flowchart is shown of the process carried out by the system 8 during creation and definition of an asset 18 by an administrator working at computer 20, for example, or at the server 10. In step 110, the asset is created on the server 10, or elsewhere and then uploaded to the server. Possibly triggered by the by the request of an administrator or by the creation of the asset 18, the system in step 113 displays the asset definition window 70 (FIG. 4), which is effectively a request for values of the various parameters to be input. Following this the server 10 receives, in step 114, inputs in the displayed entry fields 72-88 representing the parameters of the assets. Once the values of the asset definition parameters have been received, the system 8 adds the asset 18, in step 115, to the repository for temporal availability management. In step 116, the system accepts an instruction from the administrator to make the asset 18 available under one or more existing policies 17, which may be achieved by receiving a click and drag of the asset name onto a policy name. Depending on the embodiment, the system 8 then prompts the administrator in step 117 with the time availability window 90 (FIG. 5) and then accepts, in step 118, the administrator's inputs relating to the time availability of the asset. In other embodiments, the administrator is not prompted and simply chooses to provide the time availability.

Figure 7:
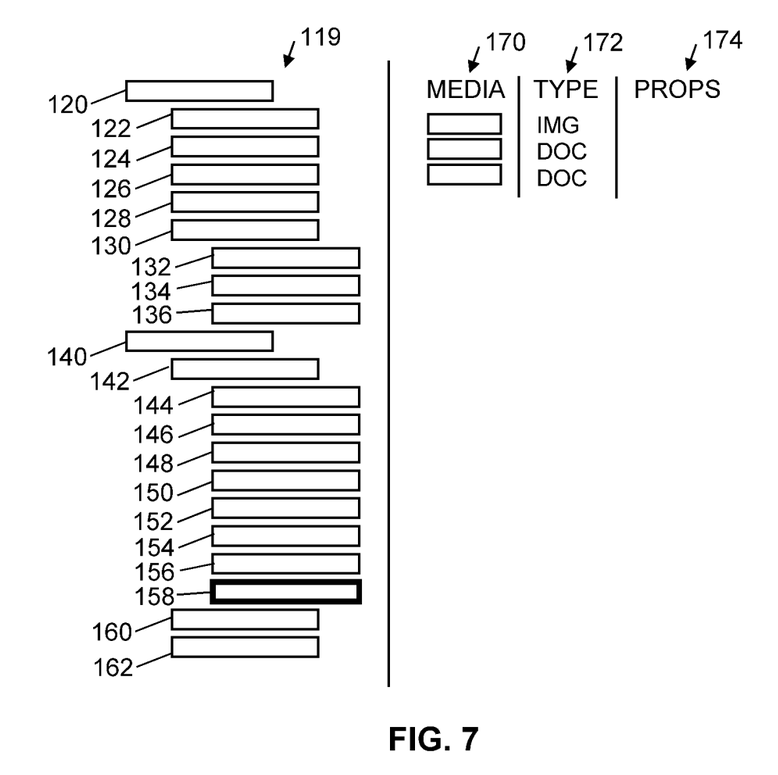
FIG. 7 is a schematic diagram of a repository tree relating to the files managed by the system, as seen by an administrator.

An example of a repository tree structure 119 of the server is shown in FIG. 7. The top most levels shown are the Applications, Profiles and Media repository 120 and the Policies repository 140. Below the Applications, Profiles and Media repository 120 are the sub-repositories In-House Applications 122, Recommended Applications 124, Configuration Profiles 126, Provisioning Profiles 128 and Media 130. In the Media sub-repository 130 there are three assets 132, 134, 136 to be protected. Below the Policies repository 140 there are repositories each corresponding to one or more remote electronic devices 30. For example, the first repository 142 may represent a single remote device, the second repository 160 may represent a group of smart phones and the third repository 162 may represent devices of a particular brand. These lists may also be used for multiple device repositories 160, 162.

In single device repository 142, which is for the policy for the single device, there are several lists, such as Allowed In-House Applications 144, Forbidden In-House Application 146, recommended Applications 148, Policy-Locked Configuration Profiles 150, Forbidden Configuration Profiles 152, Required Configuration Profiles 154, On-Demand Configuration Profiles 156 and Media 158. As well as the system being able to control the time availability of the assets listed under Media 158, it may also control the time availability (or unavailability) of everything in these lists, namely in-house applications, recommended applications and configuration profiles.

An asset may be in more than one policy and may have different availabilities for each. A device may have more than one policy. Many different permutations are possible as would be understood by someone skilled in the art.

Examples of features that may be enabled or disabled in the configuration profiles include the installation of apps, the use of the camera, FaceTime™ video calling, screen capture, automatic sync when roaming, voice dialing, app purchase, multiplayer gaming, adding friends, encrypting backups, use of the YouTube™ website, etc.

On the right of FIG. 7 is the view seen when the Media list 158 is selected. A list of the media assets governed by the policy is shown in the first column 170, with corresponding category of each asset in column 172, and further properties displayed in column 174 if required.

In another embodiment, the server 10 may automatically push new assets 18 or updated assets 18 to the device 30, as and when they are added to the memory 14, with access to them being controlled by the safe 38. The push may occur if the new or updated asset is marked as currently available to the remote device 30. Alternately, the push may occur if the new or updated asset is currently unavailable, but its policy states that it has a future availability. In the latter case, the safe 38 will prevent access to the asset until its availability time. If there is more than one update to push to the device 30, then a download queue may be transmitted to and displayed on the device 30, showing a list of the assets that are to be pushed to the device.

Conversely, as assets already downloaded to the device 30 become unavailable due to their removal from a policy, a change in policy or a removal of the device from a policy, then a push notification to the device will result in their deletion from the device. As a result, assets may automatically be installed and removed from a remote device.

Figure 8:
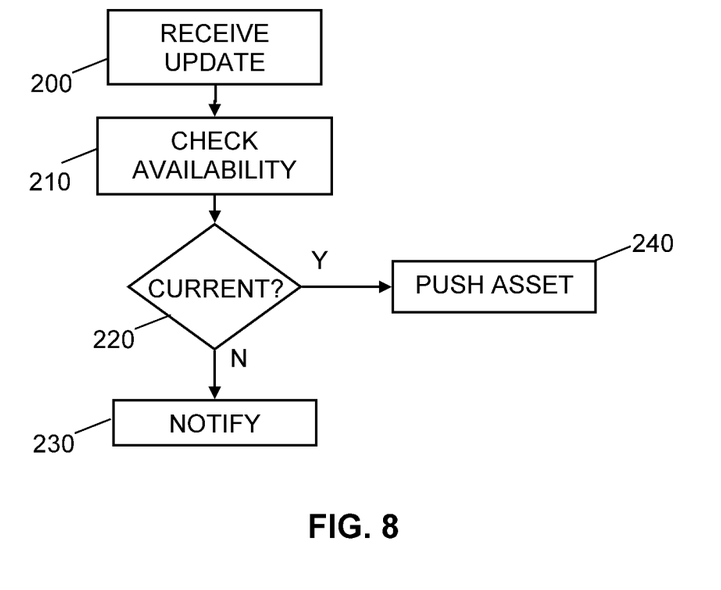
FIG. 8 is a flowchart of pushing a software asset to a remote electronic device.

Referring to FIG. 8, a flowchart is shown for pushing updated assets to the devices. In step 200 the server 10 receives an update of an asset that is already stored in the memory 14 of the server. The server then checks, in step 210, the time availability associated with the asset for a particular device 30. If, in step 220, the current time is outside of the availability time, then the server may optionally notify the device so that the safe may internally update its list of available assets. If, however, in step 220, the current time is within the availability time, then the asset is pushed to the device, in step 240.

VARIATIONS AND FURTHER FEATURES

Through the system described herein it is also possible to wipe assets and/or data from or lock remote devices by adjusting the configuration profiles at the server. This can be very useful in the event of a loss or a suspected theft of the device.

The system can be designed to manage remote devices with an array of different operating systems. It can be used to securely host, remotely deploy, and distribute in-house applications to end users. A list of approved apps can be published on each remote device, which can then provide a single-click download and installation process for users. Custom data fields may be added for the management of devices, including the setting of time availability. An administrator may send customized messages and communicate with end users wirelessly to avoid the costs associated with SMS messaging. Devices may be tracked and located on an internet map.

The system may also be used to gather numerous hardware and software information items including device serial numbers, MAC addresses, installed applications, telephone numbers, etc. from the remote devices.

The system also includes support for the Apple's™ App Store Volume Purchase Program (VPP) for schools and other educational organizations that buy Apple™ Apps in volume using purchase orders. Under Apple's™ VPP, schools can take advantage of special discounts to purchase apps in volume using purchase orders, rather than buying them individually for each device. Normally, the problem is that the only thing received for the purchase order is a VPP voucher. There is no easy way to actually distribute the apps, or to keep track of whether the VPP vouchers have been used. The present system can publish apps to managed devices, enabling end users to redeem vouchers, download and install apps with one click. In addition, it centrally tracks VPP voucher use, so that an administrator can remain informed as to when more licenses are needed. Administrators can import voucher information directly into the system, or enter it manually.

In other embodiments, the safe on the remote device may be supported by an agent. Such an agent, as used herein, is a software, hardware or firmware (or any combination thereof) agent that is ideally persistent and stealthy, and that resides in a host computer or other electronic device. The agent facilitates servicing functions which require communication with a remote server. The agent is tamper resistant and is enabled for supporting and/or providing various services such as data delete, firewall protection, data encryption, location tracking, message notification, and software deployment and updates. An illustrative embodiment of a suitable agent is found in the commercially available product Computrace Agent™. The technology underlying the Computrace Agent™ has been disclosed and patented in the U.S. and other countries, the patents having been commonly assigned to Absolute Software Corporation. See, for example, U.S. Pat. Nos. 5,715,174; 5,764,892; 5,802,280; 6,244,758; 6,269,392; 6,300,863; and 6,507,914; and related foreign patents. Details of the persistent function of the agent are disclosed in U.S. Patent Application Publication Nos. US2005/0216757 and US2006/0272020. All of these documents are fully incorporated by reference as if fully set forth herein. Ideally, the agent is also persistent, and able to self-repair if it includes software. It may in part or in whole be located in the BIOS or equivalent location in an electronic device. Communications may be initiated by the agent, by the remote server or by both. The agent may be divided into multiple parts in different locations within an electronic device. The agent may ensure the presence of the safe and its integrity, and if it is found to be compromised or out of date, it can initiate the download of a new safe from the server.

Implementations on iOS devices do not involve an agent supporting the system. Instead, a configuration profile is deployed which allows the device to be "enrolled", thus allowing it to be managed using the native features already available on the device. However, if the system is implemented on Android™ devices, for example, it can be supported by the an agent.

Processors described herein, whether in the server or the remote devices, may include one or more constituent processors, or one or more processing cores. Components of the system may be embodied on more than one server, and other architectures are also possible. Memories may be divided into separate components and different types. Components may be incorporated wholly or partially in other components described herein. Specific times and time durations given herein are examples only and may be changed depending on the embodiment desired.

The present description is of the best presently contemplated mode of carrying out the subject matter disclosed and claimed herein. Steps in the flowcharts may be performed in a different order to those shown herein, some steps may be omitted, and steps may be interchanged between the various flowcharts. Repositories may be organized in different ways. The description is made for the purpose of illustrating the general principles of the subject matter and not be taken in a limiting sense; the claimed subject matter can find utility in a variety of implementations without departing from the scope and spirit of the invention made, as will be apparent to those of skill in the art from an understanding of the principles that underlie the invention. The scope of the invention is best determined with reference to the appended claims.

The invention claimed is:

1. A system for limiting availability of software assets on electronic devices comprising:
   a server that comprises computer storage that stores software assets and availability times for assets to be accessed on an electronic device, said server comprising a processor coupled to the computer storage, and comprising or having access to a clock that maintains time, said clock being external to the electronic device, the server configured to transmit copies of the assets, and information regarding the availability times, to the electronic device; and
   an application that runs on the electronic device remotely from the server, wherein the application instructs the electronic device to at least:
      display on the electronic device a list of copies of assets that, based on a current time and on the information regarding the availability times, are currently available via the application, wherein at least one of said assets is present on the electronic device and at least another of said assets is not present on the electronic device;
      receive a selection from the list of an asset not present on the electronic device;
      retrieve a copy of the selected asset from the server;
      permit access to the copies of assets present on the electronic device, including the retrieved copy of the selected asset, when a current time as determined by the clock is within the availability time for the respective asset; and
      deny access to the copies of the assets present on the electronic device when the current time as determined by the clock is outside the availability time for the respective asset;
   wherein the electronic device comprises a timer, and wherein the application is further configured to recognize an absence of a connection between the device and the server and, as a result of said absence:
      determine an alternate current time from the timer;
      permit access to the copies of the assets when the alternate current time as determined from the timer is within the corresponding availability time; and
      deny access to the copies of the assets when the alternate current time as determined from the timer is outside the corresponding availability time.

2. The system of claim 1 wherein access is denied by deleting the copy of the asset from the electronic device.

3. The system of claim 1 wherein denying access to the copies of the assets present on the electronic device comprises one or more of:
   encrypting the copy of an asset;
   data rearrangement;
   partially deleting the copy of an asset; and
   deleting an encryption key used for encrypting the copy of an asset.

4. The system of claim 1 wherein each availability time is defined by one or more of:
   a start time;

an end time;
a start and end time; or
a sequence of durations.

5. The system of claim 1 wherein said electronic device is a mobile device.

6. The system of claim 1 wherein the application is configured to display the list with a visual indication of which of the listed assets are present on the electronic device.

7. The system of claim 1 wherein the application is configured to display the list with a visual indication that an update is available to a copy of an asset present on the electronic device.

8. The system of claim 1 wherein the application is configured to display on the electronic device a list comprising updated assets that are currently available to be downloaded from the server to the electronic device.

9. The system of claim 1 wherein the processor is configured to push a notification of an update of an asset to the device, when the update becomes available during the corresponding availability time.

10. The system of claim 1 wherein the processor is configured to push a copy of an updated asset to the device, when the updated asset becomes available during the availability time.

11. The system of claim 1 wherein the application is persistent.

12. The system of claim 1 wherein:
at least one asset is an application purchased in volume, which is to be copied to a plurality of electronic devices; and
the processor is configured to track a number of copies of said purchased application that are received by said plurality of electronic devices.

13. The system of claim 1 wherein the availability times for the copies of the assets are defined in a policy that is obtained by the electronic device from the server.

14. The system of claim 13, wherein if the policy is changed such that there is no longer an availability time for a copy of an asset, then
the server notifies the electronic device; and
the application deletes the copy of the asset.

15. The system of claim 1 wherein the server is configured to transmit a copy of an asset to the electronic device upon receiving a request from the device.

16. The system of claim 1 wherein the server transmits a copy of an asset to the device in response to that asset being stored in the computer storage.

17. The system of claim 1 wherein the application is configured to permit access to a copy of an asset only through the application and not through direct access to the copy of the asset.

18. The system of claim 1 wherein the application:
permits access to assets by displaying them on the electronic device; and
prevents the electronic device from taking a screen capture while the electronic device is displaying an asset.

19. A method for limiting availability of software assets on electronic devices comprising:
storing, in a server, software assets and availability times for the assets to be accessed on a remote electronic device;
processing, by the server, computer readable instructions stored in a memory in order to transmit the availability times to the device;
displaying, by the device, a list of assets that, based on a current time and on the availability times, are currently available via an application, wherein at least one of said assets is present on the electronic device and at least another of said assets is not present on the electronic device;
receiving a selection from the displayed list of an asset not present on the electronic device;
transmitting a copy of the selected asset from the server to the device;
permitting, by the device, access to copies of the assets present on the electronic device when a current time, as determined by a clock of the server, is within the availability time for the respective asset;
denying, by the device, access to the copies of the assets present on the electronic device when the current time, as determined by the clock in of the server, is outside the availability time for the respective asset; and
detecting an absence of a connection between the device and the server and, as a result of said absence:
determining an alternate current time from a timer of the device;
permitting access to the copies of the assets when the alternate current time as determined from the timer is within the corresponding availability time; and
denying access to the copies of the assets when the alternate current time as determined from the timer is outside the corresponding availability time.

20. The method of claim 19, further comprising:
permitting access to assets by displaying them on the electronic device; and
preventing the electronic device from taking a screen capture while the electronic device is displaying an asset.

21. An electronic device capable of limiting availability of software assets comprising:
a safe embodied in computer readable instructions in a memory, which, when executed by a processor cause the electronic device to:
display on the electronic device a list of assets that, based on a current time and on availability times associated with the assets, are currently available via the safe, wherein at least one of said assets is present on the electronic device and at least another of said assets is not present on the electronic device;
receive a selection from the list of an asset not present on the electronic device;
retrieve a copy of the selected asset from a remote server;
permit access to the copies of the assets present on the electronic device, including the retrieved copy of the selected asset, when a current time, as determined by a clock of the server, is within the availability time for the respective asset; and
deny access to the copies of the assets present on the electronic device when the current time, as determined by the clock in of the server, is outside the availability time for the respective asset;
detect an absence of a connection between the electronic device and the server:
determine, in response to detecting the absence of a connection, an alternate current time from a timer of the electronic device;
permit access to the copies of the assets when the alternate current time as determined from the timer is within the corresponding availability time; and
deny access to the copies of the assets when the alternate current time as determined from the timer is outside the corresponding availability time.

22. The electronic device of claim 21 wherein the safe further causes the electronic device to:

permit access to assets by displaying them on the electronic device; and prevent a screen capture while the electronic device is displaying an asset.

23. A non-transitory computer readable medium having stored thereon an application that restricts access to software assets on a user device based on time, said application comprising executable instructions that direct the user device to at least:

communicate with a remote server to identify, based on a time-based access restriction policy and based on a time maintained or determined by the remote server, a plurality assets currently permitted to be accessed on the user device;

display on the user device a list of the plurality of assets that, based on the time-based access restriction policy, are currently permitted to be accessed, wherein at least one asset on the list is present on the user device and at least another asset on the list is not present on the device;

retrieve from the remote server a copy of an asset not present on the device in response to a selection of said asset from the list;

when a determination is made that the asset is permitted to be accessed on the user device, provide user access to the retrieved copy of the asset;

when a determination is made that the asset is not permitted to be accessed on the user device, prevent user access to the retrieved copy of the asset without deleting the retrieved copy from the user device;

detect an absence of a connection between the user device and the remote server:

determine, in response to detecting the absence of a connection, an alternate current time from a timer of the user device;

permit access to the copy of the asset when the alternate current time as determined from the timer is within a corresponding availability time; and deny access to the copy of the asset when the alternate current time as determined from the timer is outside the corresponding availability time.

24. The computer readable medium of claim 23, wherein the application includes a user interface that displays the list together with an indication of whether each listed asset is currently present on the user device.

\* \* \* \* \*

UNITED STATES PATENT AND TRADEMARK OFFICE
CERTIFICATE OF CORRECTION

| | | |
|---|---|---|
| PATENT NO. | : 9,009,857 B2 | |
| APPLICATION NO. | : 13/662327 | |
| DATED | : April 14, 2015 | |
| INVENTOR(S) | : Bestmann et al. | |

It is certified that error appears in the above-identified patent and that said Letters Patent is hereby corrected as shown below:

In the Claims

In column 12 at line 14, change "clock in" to --clock--.

In column 12 at line 53 (approx.), change "clock in" to --clock--.

Signed and Sealed this
Eighth Day of March, 2016

Michelle K. Lee
*Director of the United States Patent and Trademark Office*